United States Patent
Tsuboi et al.

(10) Patent No.: US 7,024,273 B2
(45) Date of Patent: Apr. 4, 2006

(54) PROBE DRIVING MECHANISM FOR DISPLACEMENT MEASURING APPARATUSES

(75) Inventors: Masashi Tsuboi, Kawasaki (JP); Hiroshi Yamashiro, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 34 days.

(21) Appl. No.: 10/687,836

(22) Filed: Oct. 20, 2003

(65) Prior Publication Data

US 2004/0133300 A1 Jul. 8, 2004

(30) Foreign Application Priority Data

Oct. 25, 2002 (JP) .............................. 2002-311802

(51) Int. Cl.
*G06F 19/00* (2006.01)

(52) U.S. Cl. ........................ 700/195; 33/559; 33/560; 33/572; 33/832; 33/503; 33/504

(58) Field of Classification Search ................ 700/195, 700/193; 33/559, 560, 572, 832, 503, 504
See application file for complete search history.

(56) References Cited

U.S. PATENT DOCUMENTS

| | | | | |
|---|---|---|---|---|
| 3,633,011 A | * | 1/1972 | Bederman et al. | 700/192 |
| 4,428,055 A | * | 1/1984 | Zurbrick et al. | 700/160 |
| 4,882,848 A | * | 11/1989 | Breyer et al. | 33/559 |
| 4,916,825 A | * | 4/1990 | Breyer | 33/561 |
| 5,471,406 A | * | 11/1995 | Breyer et al. | 702/168 |
| 5,542,188 A | * | 8/1996 | Ertl et al. | 33/605 |
| 5,713,136 A | * | 2/1998 | Takei | 33/501.03 |
| 5,822,877 A | * | 10/1998 | Dai | 33/560 |
| 6,154,976 A | * | 12/2000 | Yamashiro et al. | 33/832 |
| 6,446,351 B1 | * | 9/2002 | Zhang et al. | 33/832 |

| | | | |
|---|---|---|---|
| 2002/0060756 A1 | | 5/2002 | Kurashina |
| 2003/0123943 A1 | * | 7/2003 | Hamada ...................... 409/96 |

FOREIGN PATENT DOCUMENTS

| | | |
|---|---|---|
| JP | 50-120855 | 9/1975 |
| JP | A 54-69463 | 6/1979 |
| JP | B2 58-10681 | 2/1983 |
| JP | B2 59-19283 | 5/1984 |
| JP | A 2-221801 | 9/1990 |
| JP | B2 7-78403 | 8/1995 |
| JP | A 9-189502 | 7/1997 |
| JP | A-10-307305 | 11/1998 |
| JP | A-2001-144301 | 5/2001 |
| JP | A-2001-265253 | 9/2001 |
| JP | A-2001-356709 | 12/2001 |
| JP | A-2002-244155 | 8/2002 |
| JP | A-2002-131778 | 9/2002 |
| WO | WO 01/82273 A1 | 11/2001 |

* cited by examiner

*Primary Examiner*—Leo Picard
*Assistant Examiner*—Michael D. Masinick
(74) *Attorney, Agent, or Firm*—Oliff & Berridge, PLC.

(57) ABSTRACT

A probe driving mechanism for displacement measuring apparatuses, capable of carrying out a stable, constant speed probe feeding operation without additionally providing a motor rotation detecting rotary encoder and a tachometer generator. When an output from a scale varies in accordance with the power applied to a motor, the power applied to the motor is controlled in accordance with an output from the scale. When the variation of an output from the scale becomes small even though the same level of power continues to be applied to the motor, a judement that a probe contacts the workpiece is given, and the power applied to the motor is set smaller. When an output from the workpiece sensor varies, the power applied to the motor is controlled in accordance with one of an output from the scale and that from the workpiece sensor the speed variation of which is larger than that of the other.

7 Claims, 6 Drawing Sheets

PEAK VALUE IS ALTERED ONLY WHEN PROBE CONTACTS WORKPIECE

PROBE DRIVING MECHANISM FOR DISPLACEMENT MEASURING APPARATUSES

BACKGROUND OF THE INVENTION

1. Field of Invention

This invention relates to a probe driving mechanism for displacement measuring apparatuses, and more particularly to an improvement in a probe driving mechanism for displacement measuring apparatuses, suitably used for the measurement of a soft workpiece, such as a rubber workpiece and a spring, and adapted to measure the size of a workpiece without causing the workpiece to be deformed even when a probe is brought into contact therewith.

2. Description of Related Art

The known displacement measuring apparatuses having a comparatively large range of measurement and capable of simply measuring the size of a workpiece include displacement measuring apparatuses of the type which are adapted to move a probe by a motor. Such devices bring the probe into contact with a surface of a workpiece under a predetermined pressure and detect a quantity of movement of the probe as disclosed in, for example, Japanese patent JP-B-58-10681 and Japanese patent JP-B-59-19283.

The applicant of the present invention proposed in Japanese patent JP-B-7-78403, as a displacement measuring apparatus obtained by making improvements on such displacement measuring apparatuses, and capable of conducting the measurement of the size of a workpiece under a uniform and very low measuring pressure with a high accuracy. The displacement measuring apparatus is formed by providing a parallel link mechanism on a slider capable of being moved reciprocatingly in accordance with an operation of a motor. A probe is provided on one end portion of this parallel link mechanism and a weight on the other end which is capable of applying a predetermined pressure to a workpiece via the probe owing to the weight balance between a probe-side portion of the slider and a weight-side portion thereof.

Since a rotational frequency of a motor may be detected by utilizing its back electromotive force, it is necessary that an amplification degree of a detecting circuit during a control operation carried out when the motor is operated at a low speed at which a back electromotive force is small, be set high. Therefore, it is difficult to carry out volume regulation for executing, for example, a pulse-width control operation in accordance with a detected back electromotive force, and the apparatus lacks stability.

Although it is conceivable that detectors, such as a rotary encoder and a tachometer generator be provided additionally without using a back electromotive force of the motor, the necessity of additionally providing these new detectors causes the cost of manufacturing the apparatus and bulk thereof to increase.

Furthermore, since the operation of the probe is stopped basically when the probe contacts the workpiece, it is impossible that the controlling of the motor be done until the mentioned weight balance is attained, by only an output from the displacement detector of a position measuring scale (having another name of a linear encoder including a main scale and a displacement detector).

SUMMARY OF THE INVENTION

The present invention has been made so as to solve the problems encountered in the related techniques of this kind.

In an exemplary embodiment, the invention provides a probe driving mechanism for displacement detectors which is designed to stabilize the feeding of a probe at a low speed without providing a new mechanism, and which renders it possible to carry out a measurement operation with a low measuring power. Moreover, the present invention is adapted to omit a regulating operation during the displacement detector assembling work, and attain a decrease in the manufacturing cost and the miniaturization of the displacement detector.

The present invention has solved these problems by providing a probe driving mechanism for a displacement measuring apparatus for use in measuring the size of a workpiece without causing the workpiece to be deformed even when the probe is brought into contact therewith, the probe driving mechanism including a motor for driving the probe, a scale for detecting the displacement of the probe, a workpiece sensor for detecting the engagement of the probe with the workpiece, and a device for controlling the power applied to the motor, in accordance with an output from the scale when the output from the scale varies in accordance with the power applied to the motor; giving a judgement that the probe contacts the workpiece when the variation of an output from the scale becomes small even though the same level of power continues to be applied to the motor, and setting the power applied to the motor smaller; and controlling the power applied to the motor, in accordance with an output, the speed variation of which is larger, out of an output from the scale and that from the workpiece sensor when the output from the work sensor varies.

BRIEF DESCRIPTION OF THE DRAWINGS

A preferred embodiment of the present invention will be described with reference to the accompanying drawings, wherein.

DETAILED DESCRIPTION OF PREFERRED EMBODIMENTS

An exemplary embodiment of the present invention will now be described in detail with reference to the drawings.

Figure 1:
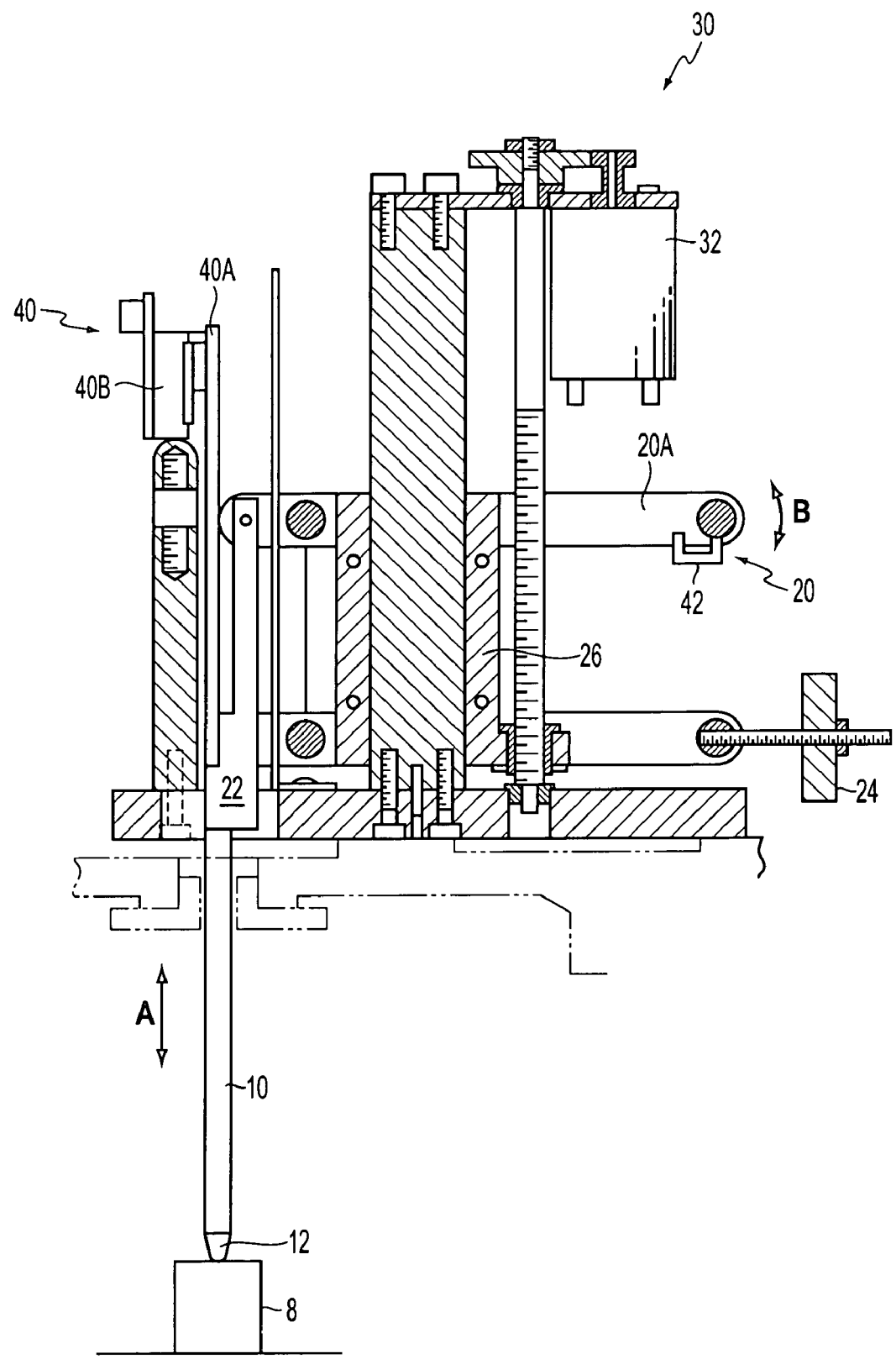
FIG. 1 is a sectional view showing the mechanical construction of the displacement measuring apparatus in an exemplary embodiment of the present invention.
Figure 2:
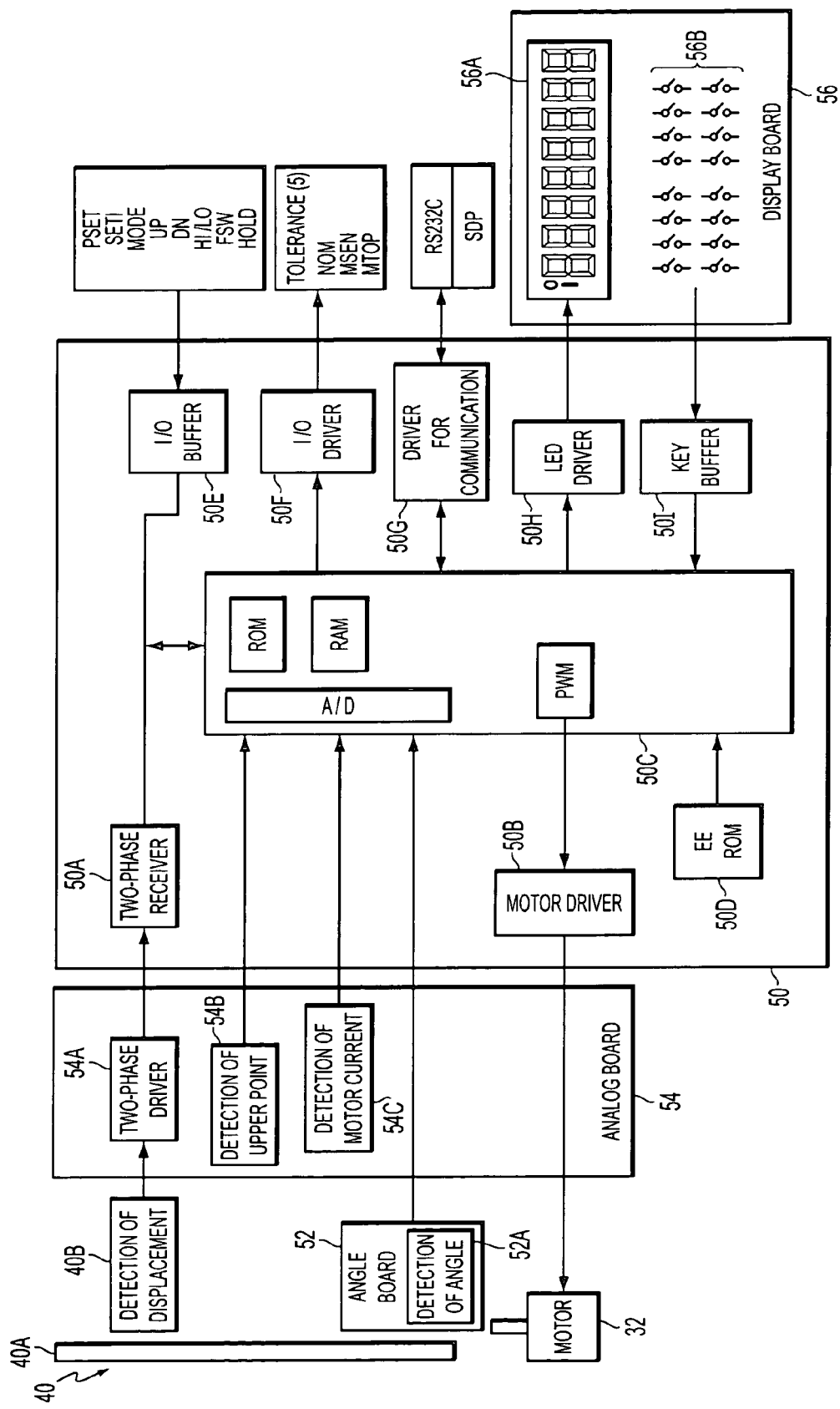
FIG. 2 is a block diagram of the construction of an electric circuit of the same displacement measuring apparatus according to an exemplary embodiment of the invention.

As shown in FIG. 1 (mechanical construction) and FIG. 2 (circuit construction), this exemplary embodiment includes a probe 12 provided at a free end (lower end in the drawing) of a vertically (in the direction of an arrow A) displaceable spindle 10, a parallel link mechanism 20 having at one side thereof a holder 22 to which the spindle 10 is fixed, and at the opposite side of the spindle 10 a weight 24 for reducing a measuring pressure. A slider 26 is provided for supporting the parallel link mechanism 20 so that the link mechanism can be moved freely in the vertical direction, and a motor 32 for driving the slider 26 in the vertical direction of the drawing via a power transmission unit 30. The embodiment is further provided with, for example, a photoelectric scale 40 (photoelectric linear encoder) adapted to detect the vertical displacement of the probe 12 and provided at an upper portion of the holder 22, and a workpiece sensor 42 including, for example, a non-contact photocoupler and working as an angle sensor pivotable in the direction of an arrow B and adapted to detect the engagement of the probe 12 with a workpiece 8 when a link member 20A of the parallel link mechanism 20 attains a predetermined angle. When an output from the scale 40 varies in accordance with the power applied to the motor 32, the power applied to the motor 32 in accordance with an output from the scale 40 is controlled. When the variation of an output from the scale 40 becomes small even though the same level of power continues to be applied to the motor 32, a judgement that the probe 12 contacts the workpiece 8 is given, and the power applied to the motor 32 is reduced. To deal with the variation of an output from the work sensor 42, a main board 50 (FIG. 2) including a control circuit for controlling the power, which is applied to the motor 32, in accordance with one of an output from the scale 40 and that from the workpiece sensor 42 the speed variation of which is larger than that of the other, an angle board 52, an analog board 54, and a display board 56 including a LED display 56A and a key switch 56B are mainly provided.

The details of the mechanical construction of this embodiment are substantially identical with those of the mechanical construction of the invention disclosed in the Japanese patent JP-B-7-78403.

In an exemplary embodiment, the scale 40 is made of, for example, a photoelectric encoder fixed at an upper part of the spindle 10 and including a main scale 40A fixed at a lower end thereof to the holder 22 constituting a part of the parallel link mechanism 20, and a displacement detector 40B for detecting the vertical displacement of the main scale 40A.

The angle board 52 is mounted with a circuit 52A which carries out an angle detecting operation on the basis of an output from the workpiece sensor 42. This workpiece sensor 42 is preferably a non-contact type sensor so as not to give influence upon a motion of the parallel link mechanism 20. Accordingly, it is preferable that this workpiece sensor 42 be made of a photocoupler. In general, the photocoupler includes mainly a light-emitting element and a light receiving element, and is adapted to output two signals only, i.e. ON and OFF signals representative of the transmission of light and non-transmission of light through the light receiving element. According to the exemplary embodiment of the present invention, an output signal from the light receiving element represents a light screening rate, so that an angle of the parallel link mechanism 20 can be detected on the basis of this output signal.

As shown in detail in FIG. 2, the analog board 54 is mounted with a driver 54A for the displacement detector 40B, an upper point detecting circuit 54B adapted to detect an upper limit position of the spindle 10 and place restrictions on the movement of the spindle 10, and a motor current detecting circuit 54C for protecting the motor 32 from an overcurrent The main board 50 includes a receiver 50A adapted to receive an output from the driver 54A, a driver 50B for the motor 32, a microcomputer 50C including an A/D converter, a ROM, a RAM and a pulse width modulator (PWM), its EEROM 50D, an I/O buffer 50E, an I/O driver 50F, a driver 50G for communication used to make communication by, for example, RS 232C, a LED driver 50H for driving the LED display 56A on the display board 56, and a key buffer 50I for driving a key switch 56B on the same display board 56.

Figure 3:
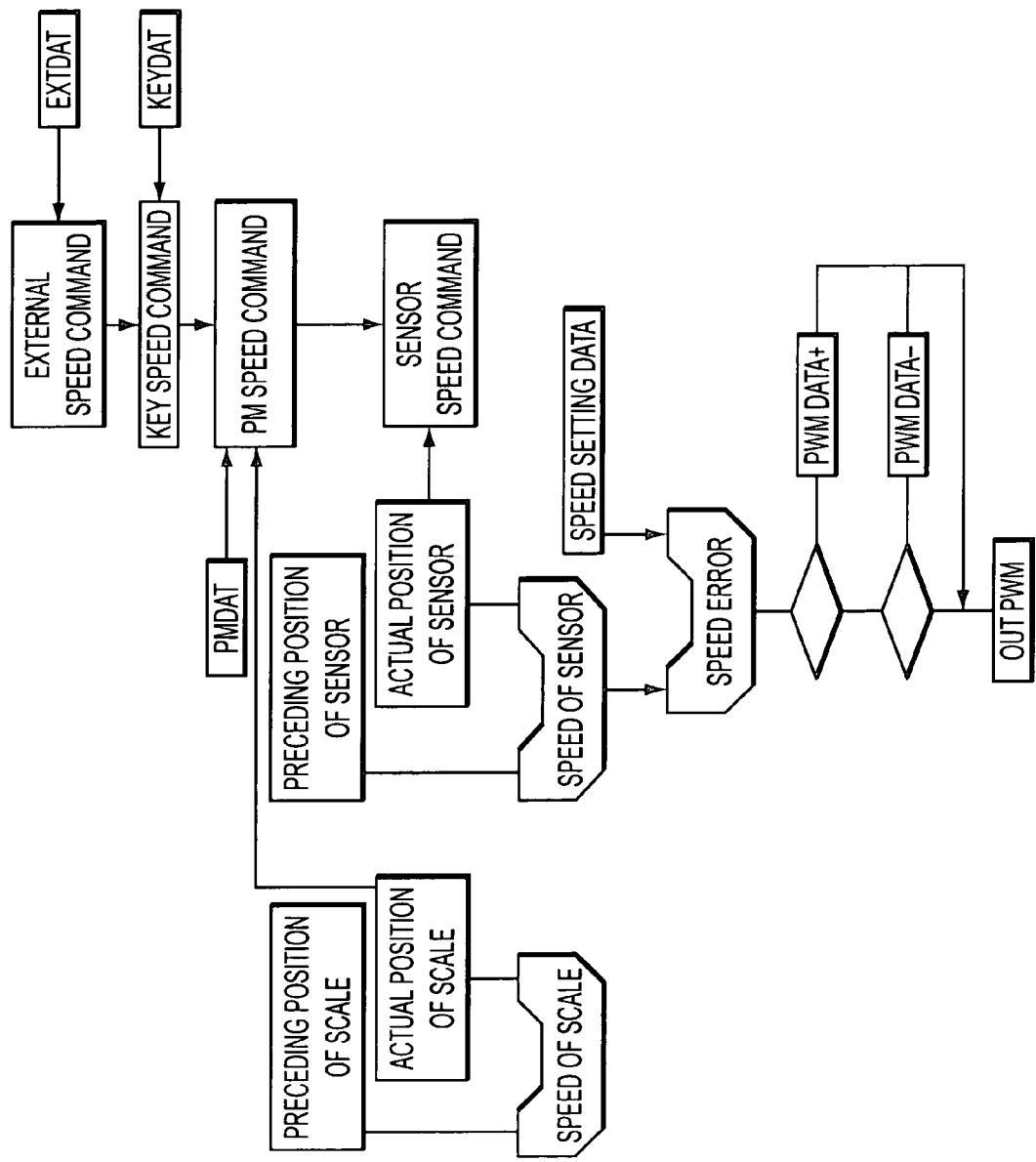
FIG. 3 is a flow chart showing a motor controlling algorithm of the same displacement measuring apparatus according to an exemplary embodiment of the invention.

A control operation in the microcomputer 50C is carried out in accordance with the algorithm shown in FIG. 3. Namely, the motor control operation is carried out as a control operation based on a PM speed command in accordance with a difference between a target carry-over position stored in a position memory (PM) and an actual position, and a control operation based on an output from the scale 40 and output data from the workpiece sensor 42 are switched from one to the other, and vice versa in accordance with the situation.

Figure 4:
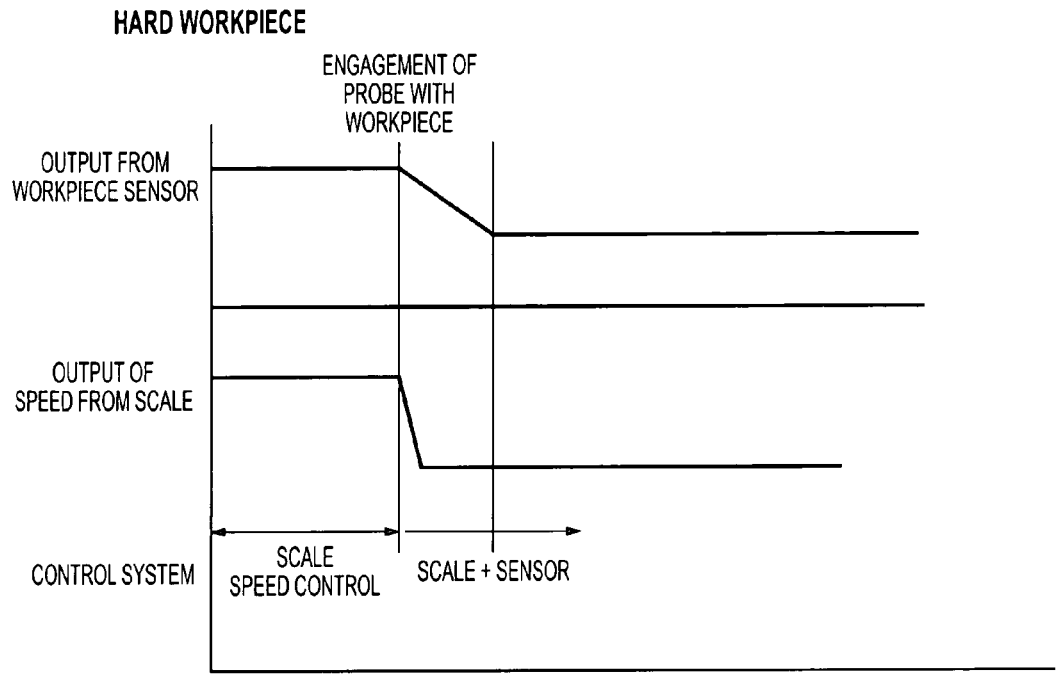
FIG. 4 is a time chart showing a control method used during the measurement of a hard workpiece with the same displacement measuring apparatus according to an exemplary embodiment of the invention.

In the case of a hard workpiece, such as a metal block as shown in FIG. 4, a speed control operation (called a scale speed control operation) based on an output from a regular scale 40 is carried out until the engagement of the probe with the workpiece is detected owing to the variation of an output from the same sensor, and, when an output from the workpiece sensor 42 starts varying owing to the engagement of the same probe with the workpiece 8, a control operation is carried out (scale+sensor) in accordance with one of the scale 40 and workpiece sensor 42 the speed variation of which is larger than that of the other.

Figure 5:
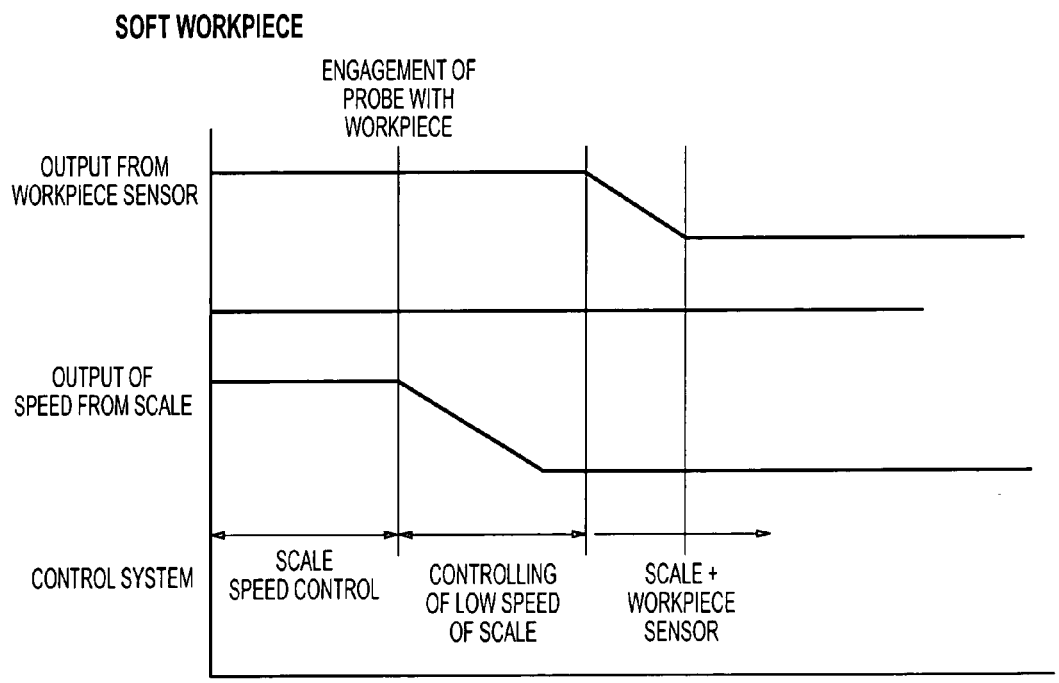
FIG. 5 is a time chart showing a control method used during the measurement of a soft workpiece with the same displacement measuring apparatus according to an exemplary embodiment of the invention.

In the case of a soft workpiece, such as rubber and a plastic material, which are readily deformed, a period of time exists during which an output from the workpiece sensor 42 does not vary even though the probe 12 engages the workpiece 8. Therefore, when the speed of the scale 40 starts lowering as shown in FIG. 5 even though the power the level of which is equal to that of the power applied to the motor 32 in the scale speed control region is applied to the motor 32, a judgement that the probe 12 engages the workpiece 8 is given, and a target value of speed is reset, a power control operation for the motor 32 being thereby carried out (the controlling of a very low speed of the scale). When the output from the workpiece sensor 42 then starts varying, a control operation is carried out (scale+sensor) in accordance with one of an output from the scale and that from the workpiece sensor the speed variation of which is larger than that of the other.

Figure 6:
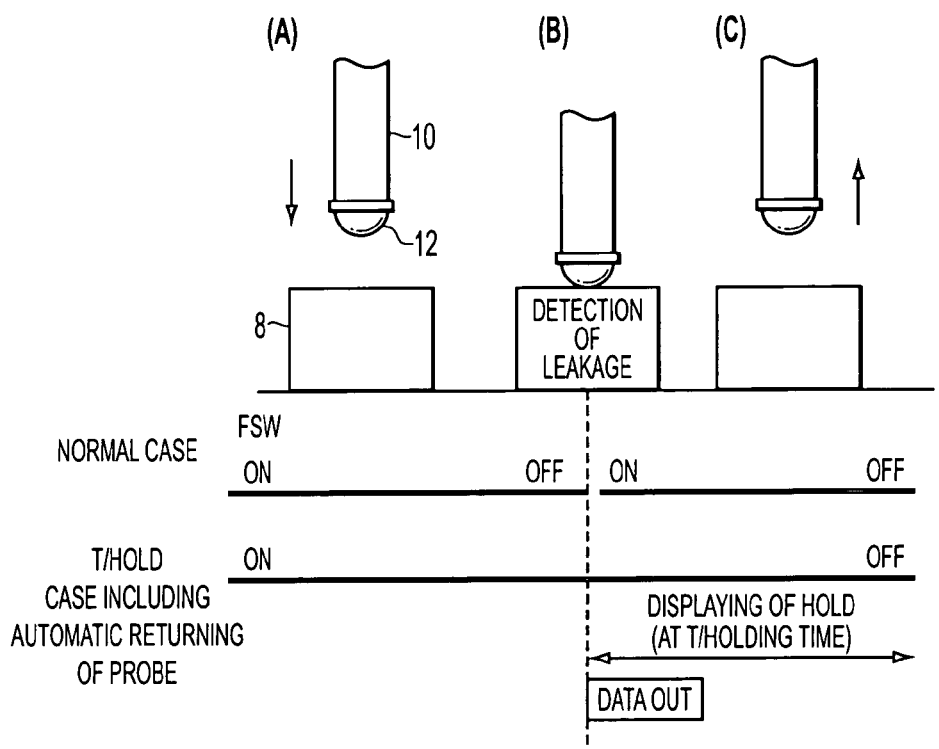
FIG. 6 is a front view showing the condition of automatic holding of a measurement value and automatic retracting of a probe using a workpiece sensor, one of the measurement algorithm of the same displacement measuring apparatus according to an exemplary embodiment of the invention.

According to this exemplary embodiment, the automatic holding of a measurement value and automatic retracting of the probe 12 using an output from the workpiece sensor 42 are also possible as shown in FIG. 6. Namely, as shown in FIG. 6A, when the lowering of the probe 12 and the bringing of the same into contact with the workpiece 8 (FIG. 6B) are detected by an output from the workpiece sensor 42, the measurement data or display value represented by an output signal from the displacement detector 40B of the scale 40 is taken in and held as a measurement value of the workpiece 8. This gives a judgement that the measurement operation is completed, and the probe 12 is retracted upward quickly by a predetermined quantity, as shown in FIG. 6C. Thus, it becomes possible to conduct the automatic measurement of a workpiece 8 in which the deformation thereof is prevented to as great an extent as possible.

Figure 7:
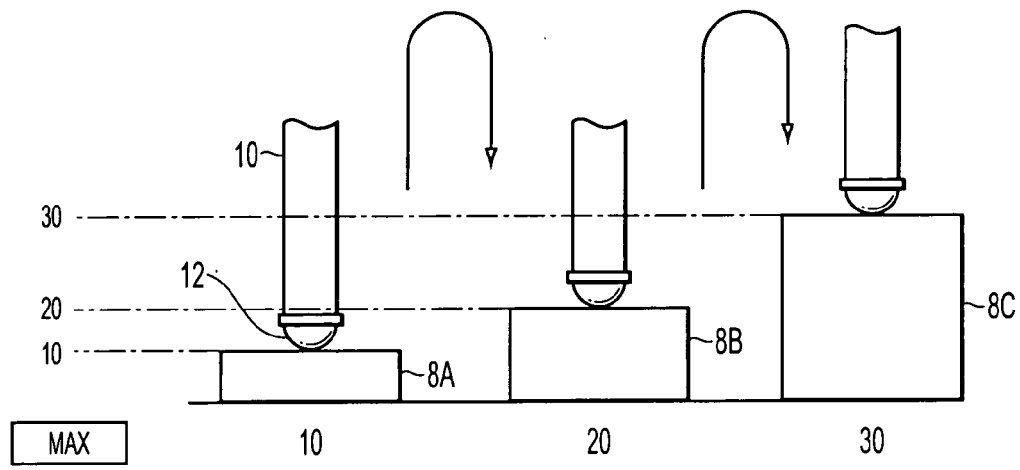
FIG. 7 is a front view showing the condition of automatic measurement of a maximum value of a plurality of workpieces using a workpiece sensor of the same displacement measuring apparatus according to an exemplary embodiment of the invention.

As shown in FIG. 7, the automatic measurement of maximum and minimum values of a plurality of workpieces 8A, 8B, 8C using an output from the workpiece sensor 42 is also possible. Namely, as in the case of the measurement of maximum values illustrated in FIG. 7, the measurement of workpieces 8A, 8B, 8C is sequentially conducted in order that a peak value is altered only when the probe 12 contacts the workpiece 8 early during a downward movement of the probe 12. This enables the maximum values of the plural workpieces 8A, 8B, 8C to be determined. Conversely, when a peak value is altered only when the probe 12 contacts the workpiece late, minimum values can be determined.

Figure 8:
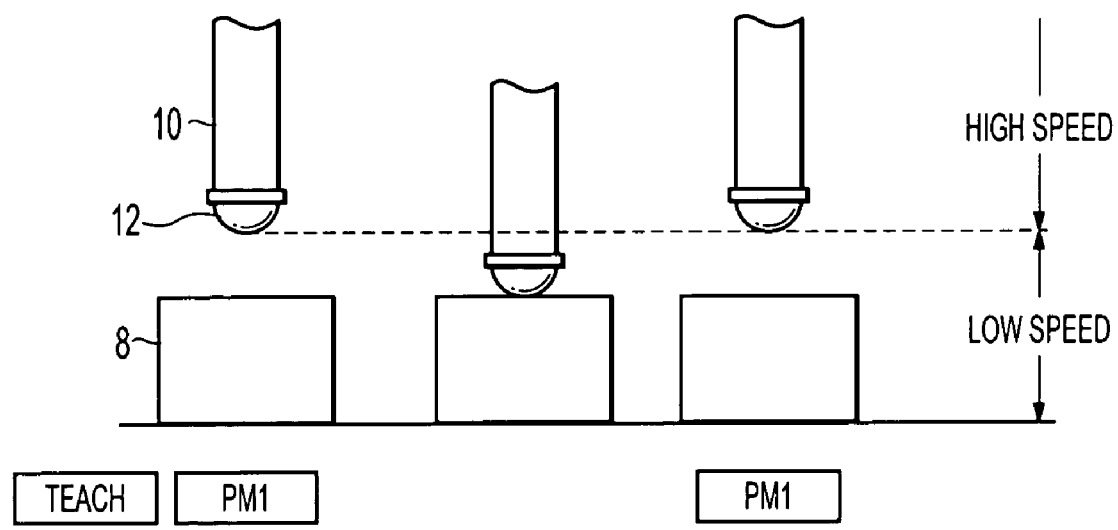
FIG. 8 is a front view showing the condition of measurement utilizing a position memory of the same displacement measuring apparatus according to an exemplary embodiment of the invention.

The measurement can also be conducted by carrying out a control operation so that the probe 12 is moved at a high speed up to a set height of PM1, and at a low speed from a set height of not greater than PM1 with a high position reproducibility (for example, ±1 µm with respect to a displayed value) to contact with the surface of the workpiece 8 as shown in FIG. 8, by utilizing a value of a position memory (PM) made capable of storing the positions of, for example, up to three spindles.

When such techniques are utilized, an independent automatic measurement operation can be conducted with a displacement measuring apparatus without using a sequencer and a dedicated microcomputer.

Since a photoelectric scale is used as the scale 40 in this exemplary embodiment, the vertical position of the probe 12 can be measured in a non-contact state and with a high accuracy. The kind of the scale is not limited to a photoelectric type. A linear type scale, which is other than the photoelectric type scale, such as an electrostatic capacity type scale, or a rotary scale can also be used.

Since a photocoupler may be used as the workpiece sensor 42 in this exemplary embodiment, the displacement of the link member 20A can be detected in a non-contact state. The kind of workpiece sensor is not limited to the photocoupler. For example, a strain gauge and an electric microgauge can also be used.

The kind of the motor 32 is not limited to a regular rotary motor. Other kinds of motors, such as a linear motor, a linear actuator, a piezoelectric motor, an ultrasonic motor and a rotary motor can also be used.

The mechanism for retaining the probe 12 under a low measuring pressure is not limited to the parallel link mechanism 20. A parallel leaf spring and a linear guide can also be used.

According to the present invention, it becomes possible to stabilize the low-speed feeding of a probe 12 without additionally providing a new mechanism, such as a motor rotation detecting rotary encoder and a tachometer generator, and measure the size of a workpiece 8 with low measuring power. Therefore, it becomes possible to omit a regulation operation during the assembling of the probe driving mechanism by abolishing the provision of, for example, a pulse width control knob, and thereby reduce the cost of manufacturing the driving mechanism and the dimensions thereof.

What is claimed is:

1. A probe driving mechanism for displacement measuring apparatuses for use in measuring the sizes of a workpiece without causing the workpiece to be deformed even when a probe is brought into contact therewith, comprising:
   a motor for driving the probe;
   a scale for detecting the displacement of the probe;
   a workpiece sensor for detecting the engagement of the probe with the workpiece; and
   a device for:
      controlling a power being applied to the motor based on an output from the scale when the output from the scale varies based on the power applied to the motor;
      making a judgment that the probe contacts the workpiece when the output from the scale becomes less than a level of power being applied to the motor, and then reducing the power being applied to the motor; and
      subsequently controlling the power being applied to the motor based on a greater one of speed variation of the output from the scale and an output from the workpiece sensor when the output from the workpiece sensor varies.

2. The probe driving mechanism for displacement measuring apparatuses according to claim 1, wherein the probe is supported on a parallel link mechanism so that the probe can be moved freely in the vertical direction, and the output from the workpiece sensor varies when the probe contacts the workpiece to cause a link member constituting the parallel link mechanism to attain a predetermined angle owing to the engagement of the probe with the workpiece.

3. The probe driving mechanism for displacement measuring apparatuses according to claim 2, wherein, when the output from the workpiece sensor varies and attains a predetermined level, the output from the scale is held and determined as a measurement value of the workpiece.

4. The probe driving mechanism for displacement measuring apparatuses according to claim 3, wherein, when the output from the scale is held and determined as a measurement value of the workpiece with a judgment that the measurement operation is completed given, the probe is retracted upward by a predetermined quantity, and a measurement operation in which the deformation of the workpiece is prevented is conducted.

5. The probe driving mechanism for displacement measuring apparatuses according to claim 3, wherein a position memory for storing vertical positions of the probe therein is further provided, the measurement of the workpiece being conducted by controlling the movement of the probe so that the probe is moved at a high speed up to the height stored in the position memory and then at a low speed from the mentioned height so as to bring the probe into contact with a surface of the workpiece.

6. The probe driving mechanism for displacement measuring apparatuses according to claim 1, wherein the workpiece sensor is made of a photocoupler, and detects in a non-contact state the attainment of a predetermined angle by a link member constituting a parallel link mechanism to cause an output from the photocoupler to vary.

7. The probe driving mechanism for displacement measuring apparatuses according to claim 1, wherein the scale is a non-contact type photoelectric encoder.

* * * * *